United States Patent
Sun et al.

(10) Patent No.: US 11,994,136 B2
(45) Date of Patent: May 28, 2024

(54) POWER ELECTRONICS COOLING ARRANGEMENT

(71) Applicant: DANFOSS A/S, Nordborg (DK)

(72) Inventors: Lin Xiang Sun, Tallahassee, FL (US); Brandon Keith Pritchard, Tallahassee, FL (US)

(73) Assignee: DANFOSS A/S, Nordborg (DK)

( * ) Notice: Subject to any disclaimer, the term of this patent is extended or adjusted under 35 U.S.C. 154(b) by 265 days.

(21) Appl. No.: 17/618,910

(22) PCT Filed: Jul. 31, 2020

(86) PCT No.: PCT/US2020/044570
§ 371 (c)(1),
(2) Date: Dec. 14, 2021

(87) PCT Pub. No.: WO2021/022192
PCT Pub. Date: Feb. 4, 2021

(65) Prior Publication Data
US 2022/0252073 A1    Aug. 11, 2022

Related U.S. Application Data

(60) Provisional application No. 62/881,550, filed on Aug. 1, 2019.

(51) Int. Cl.
*F04D 27/00* (2006.01)
*F04D 17/12* (2006.01)
*F24F 1/24* (2011.01)
*F25B 31/00* (2006.01)
*H02K 11/25* (2016.01)

(52) U.S. Cl.
CPC ......... *F04D 17/122* (2013.01); *F04D 27/007* (2013.01); *F24F 1/24* (2013.01); *F25B 31/008* (2013.01); *H02K 11/25* (2016.01); *F25B 2700/1933* (2013.01)

(58) Field of Classification Search
CPC ........ F04D 17/122; F25B 1/10; F25B 31/006; F25B 31/008; F25B 2600/022; F25B 2700/1933
See application file for complete search history.

(56) References Cited

U.S. PATENT DOCUMENTS

| | | | |
|---|---|---|---|
| 3,253,646 A | 5/1966 | Koltuniak et al. | |
| 3,859,815 A * | 1/1975 | Kasahara | F25B 1/10 62/505 |
| 5,350,039 A | 9/1994 | Voss et al. | |
| 6,189,335 B1 | 2/2001 | Ebara et al. | |
| 6,604,372 B2 * | 8/2003 | Baumert | B60H 1/00271 62/199 |
| 2008/0245083 A1 | 10/2008 | Tutunoglu et al. | |

(Continued)

*Primary Examiner* — Jonathan Bradford
(74) *Attorney, Agent, or Firm* — Carlson, Gaskey & Olds, P.C.

(57) ABSTRACT

A refrigerant compressor includes, among other things, a first stage and a second stage downstream of the first stage, and a cooling line configured to cool power electronics. The cooling line is configured to be switched between a first mode and a second mode. The first mode is configured to dump refrigerant between the first stage and the second stage, and the second mode is configured to dump refrigerant upstream of the first stage.

19 Claims, 4 Drawing Sheets

(56) References Cited

U.S. PATENT DOCUMENTS

| | | | |
|---|---|---|---|
| 2010/0064707 A1* | 3/2010 | Sato | F25B 31/008 |
| | | | 417/253 |
| 2011/0023513 A1* | 2/2011 | Hamel | F16K 31/047 |
| | | | 62/211 |
| 2011/0023514 A1* | 2/2011 | Mitra | F25B 1/10 |
| | | | 62/513 |
| 2012/0266622 A1 | 10/2012 | Inaba et al. | |
| 2013/0098086 A1 | 4/2013 | Sillato et al. | |

\* cited by examiner

POWER ELECTRONICS COOLING ARRANGEMENT

CROSS-REFERENCE TO RELATED APPLICATIONS

This application claims priority to U.S. Provisional Application No. 62/881,550, which was filed on Aug. 1, 2019 and is incorporated herein by reference.

BACKGROUND

Refrigerant compressors are used to circulate refrigerant in a chiller or heat pump via a refrigerant loop. Refrigerant loops are known to include a condenser, an expansion device, and an evaporator.

Some compressors provide cooling to the motor and/or associated power electronics by conveying refrigerant from the main loop to the motor or other power electronics.

SUMMARY

A refrigerant compressor according to an exemplary aspect of the present disclosure includes, among other things, a first stage and a second stage downstream of the first stage, and a cooling line configured to cool power electronics. The cooling line is configured to be switched between a first mode and a second mode. The first mode is configured to dump refrigerant between the first stage and the second stage, and the second mode is configured to dump refrigerant upstream of the first stage.

In a further non-limiting embodiment of the foregoing refrigerant compressor, the compressor is a centrifugal compressor and first stage comprises a first impeller and the second stage comprises a second impeller.

In a further non-limiting embodiment of the foregoing refrigerant compressor, a controller is configured to switch between the first and second modes automatically in response to an input from a sensor.

In a further non-limiting embodiment of the foregoing refrigerant compressor, the controller is configured to monitor a suction pressure of the compressor, and the controller is configured to automatically switch to the second mode when the suction pressure is above a predetermined threshold.

In a further non-limiting embodiment of the foregoing refrigerant compressor, the controller is configured to automatically direct the return of the cooling flow in a real time manner based on operating conditions.

In a further non-limiting embodiment of the foregoing refrigerant compressor, the cooling line is configured to be switched between the first mode and the second mode by inserting a plug along the cooling line.

In a further non-limiting embodiment of the foregoing refrigerant compressor, the compressor comprises a housing, and the plug is accessible external to the housing.

In a further non-limiting embodiment of the foregoing refrigerant compressor, the plug is a threaded plug.

In a further non-limiting embodiment of the foregoing refrigerant compressor, a directional flow control valve is configured to switch between the first mode and the second mode.

In a further non-limiting embodiment of the foregoing refrigerant compressor, the second mode is used for high SST, or low pressure difference cooling applications.

A refrigerant system according to an exemplary aspect of the present disclosure includes, among other things, a main refrigerant loop in communication with a condenser, an evaporator, and a compressor. The compressor has a first stage and a second stage downstream of the first stage. A cooling line is configured to be switched between a first mode and a second mode, wherein the first mode is configured to dump refrigerant between the first stage and the second stage, and the second mode is configured to dump refrigerant upstream of the first stage.

In a further non-limiting embodiment of the foregoing refrigerant system, the cooling line is configured to cool power electronics.

In a further non-limiting embodiment of the foregoing refrigerant system, the power electronics comprises a silicon controlled rectifier, and the cooling line comprises a heat exchanger arranged to cool the silicon controlled rectifier.

In a further non-limiting embodiment of the foregoing refrigerant system, a first plug is arranged in the heat exchanger.

In a further non-limiting embodiment of the foregoing refrigerant system, the cooling line is configured to be switched between the first mode and the second mode by inserting a plug along the cooling line.

In a further non-limiting embodiment of the foregoing refrigerant system, the compressor is arranged in a housing, and the plug is accessible external to the housing.

In a further non-limiting embodiment of the foregoing refrigerant system, a controller is configured to switch between the first and second modes automatically in response to an input from a sensor.

In a further non-limiting embodiment of the foregoing refrigerant system, the controller is set to direct the return of the cooling flow based on applications of normal comfort cooling or high SST cooling.

In a further non-limiting embodiment of the foregoing refrigerant system, the controller is configured to direct the return of the cooling flow in a real time manner based on operating conditions.

In a further non-limiting embodiment of the foregoing refrigerant system, the controller is configured to monitor a suction pressure of the compressor, and the controller is configured to automatically switch to the second mode when the suction pressure is above a predetermined threshold.

DETAILED DESCRIPTION

Figure 1:
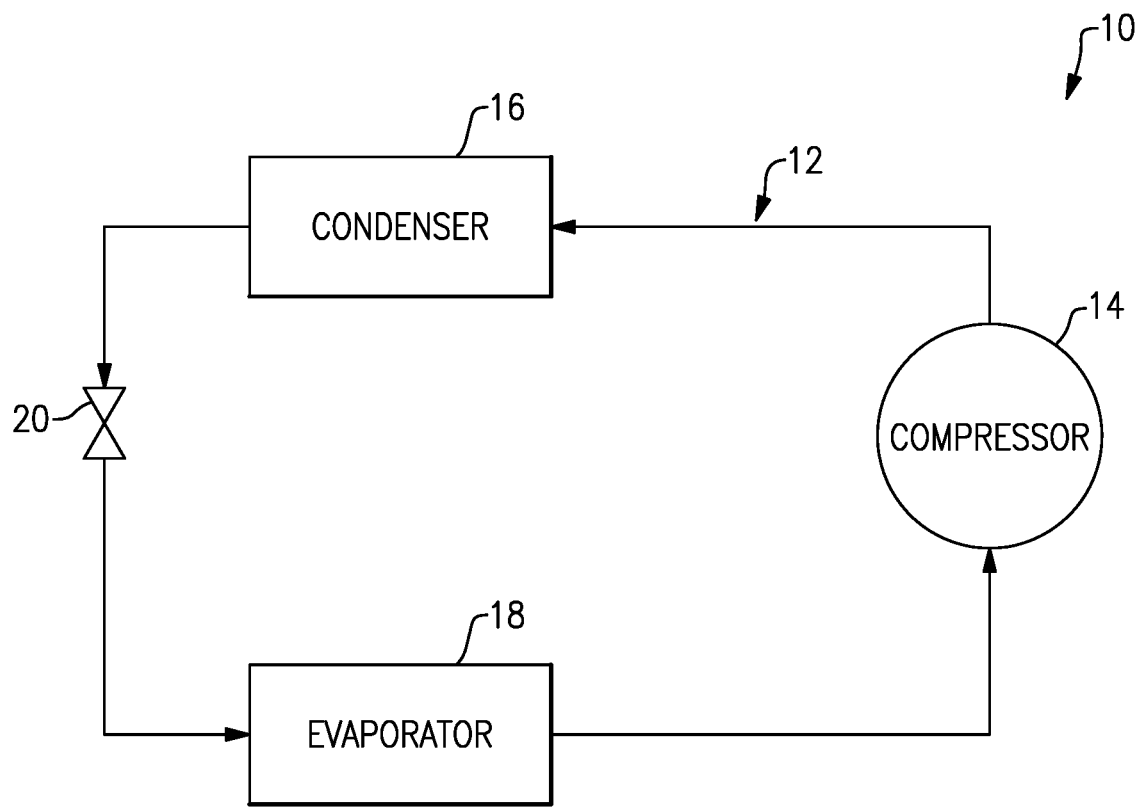
FIG. 1 is a schematic illustration of a refrigerant loop.

FIG. 1 schematically illustrates a refrigerant cooling system 10. The refrigerant system 10 includes a main refrigerant loop, or circuit, 12 in communication with a compressor or multiple compressors 14, a condenser 16, an evaporator 18, and an expansion device 20. This refrigerant system 10 may be used in a chiller or heat pump, for example. Notably, while a particular example of the refrigerant system 10 is shown, this application extends to other refrigerant system configurations. For instance, the main refrigerant loop 12 can include an economizer downstream of the condenser 16 and upstream of the expansion device 20. The refrigerant cooling system 10 may be an air condition system, for example.

Figure 2:
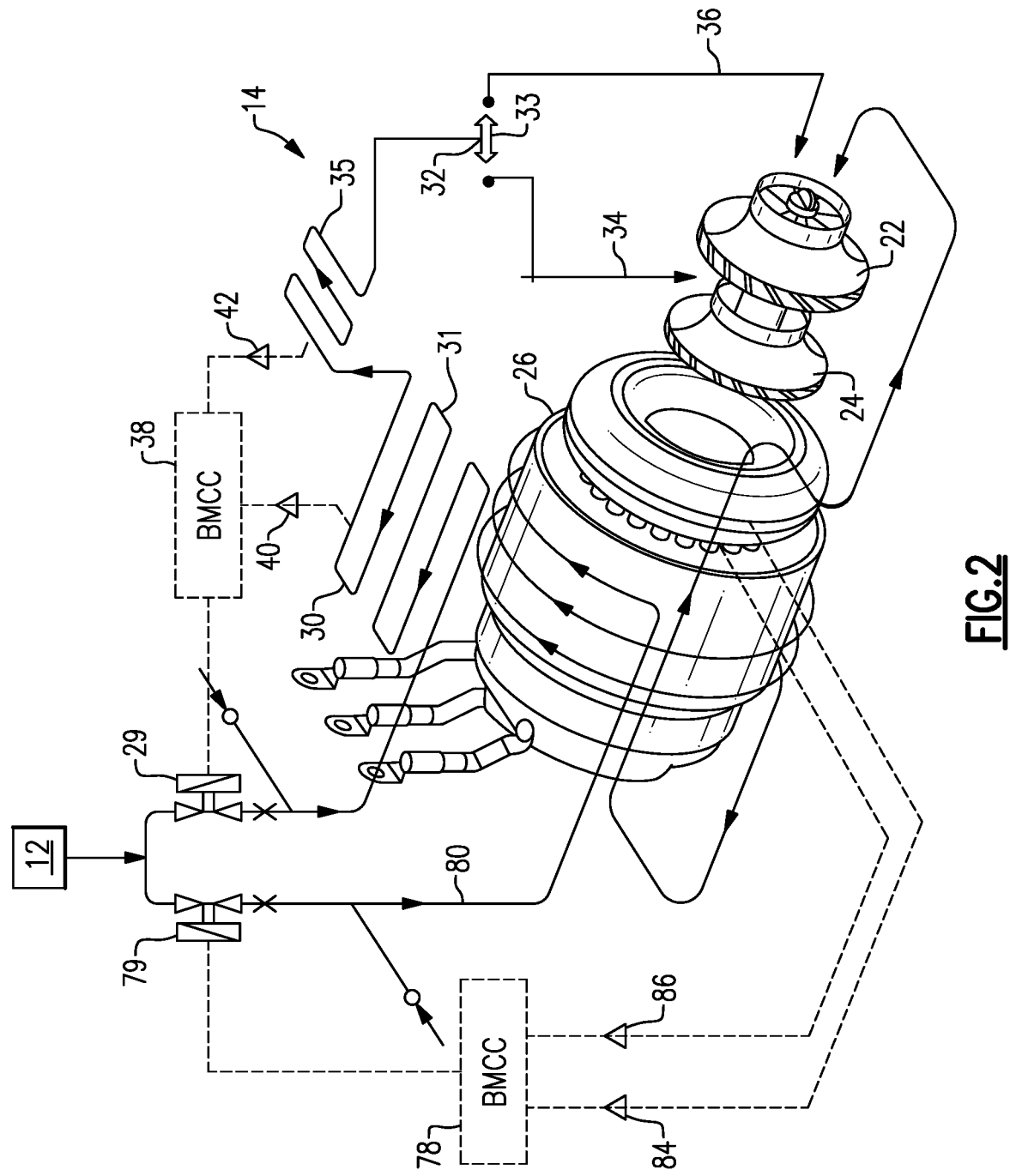
FIG. 2 is a schematic illustration of an example compressor cooling arrangement.

FIG. 2 schematically illustrates an example compressor 14. The example compressor 14 is a two-stage compressor. A first impeller 22 is upstream of a second impeller 24. The example compressor 14 is a two stage centrifugal compressor. Other multiple-stage compressors may be utilized in other embodiments. In some embodiments, one stage includes an impeller and shroud arrangement, and another stage includes an alternative arrangement. The impellers 22, 24 are driven by a motor 26.

The compressor 14 may be a split cooling compressor. A first cooling line 30 draws cooling fluid from the main refrigerant loop 12 (shown in FIG. 1) for the power electronics, such as an insulated-gate bipolar transistor (IGBT) and a silicon controlled rectifier (SCR), for example. In the illustrated example, the cooling line 30 has a first heat exchanging portion 31 for cooling an IGBT and a second heat exchanging portion 35 for cooling an SCR. A second cooling line 80 from the main refrigerant loop 12 cools the motor 26, for example. A first solenoid 29 may be in communication with a first controller 38 to control the fluid entering the first cooling line 30. A second solenoid 79 may be in communication with a second controller 78 to control the fluid entering the second cooling line 80. Although illustrated as two controllers 38, 78, it should be understood that a single controller may be used for both cooling lines 30, 80. The controller 38, 78 may be a Bearing Motor compressor controller (BMCC). The controller 78 may be in communication with sensors 84, 86 arranged along the cooling line 80, for example. In the illustrated example, a first temperature sensor 84 provides a temperature at the motor windings and a second temperature sensor 86 provides a temperature at the motor cavity.

The cooling line 30 returns the cooling fluid to the main refrigerant loop 12 near the compressor 14. In this example, the cooling line 30 is selectable to return the cooling fluid to one of at least two places at a juncture 32. The cooling line 30 may be configured in a first mode or a second mode. In the first mode, the cooling line 30 is configured to return cooling fluid via a first line 34 that dumps cooling fluid between the first and second impellers 22, 24. This is known as an inter-stage return, in some examples. In the second mode, the cooling line 30 is configured to return cooling fluid via a second line 36 upstream of the first impeller 22. The spot 36 may be the evaporator 18 or suction side of the compressor 14.

The first and second modes may be selected manually or automatically. The first mode may be used for regular comfort cooling applications, while the second mode may be used for high saturated suction temperature (SST) cooling applications, such as data centers. In some examples, the controller 38 is used to switch between the first and second modes. The controller 38 may be in communication with sensors 40, 42 arranged along the cooling line 30, for example. In the illustrated example, a first temperature sensor 40 provides a temperature at the IGBT and a second temperature sensor 42 provides a temperature at the SCR. In one embodiment, a directional flow control valve 33 is used to switch between the first mode and the second mode.

The controller 38 may monitor the suction pressure of the compressor 14, in some examples. In some examples, the controller 38 will direct the valve 33 to return the cooling fluid via the second line 36 if the suction pressure of the compressor 14 is above a preset value. This is the second mode with a suction return. If the suction pressure is below the preset value, the valve 33 will return the cooling fluid via the first line 34. This is the first mode inter-stage return. The first mode may be the default mode, for example.

The controller 38 may monitor the pressure difference in the cooling line and temperature sensors 40 and 42 in real time. In case of low-pressure difference and the temperature sensor readings continuously above the set points, the controller 38 can direct the valve 33 to return to the second line 36. If the pressure difference is enough to keep the temperature set points, it can direct the return to 34 to increase the total system efficiency.

Figure 3:
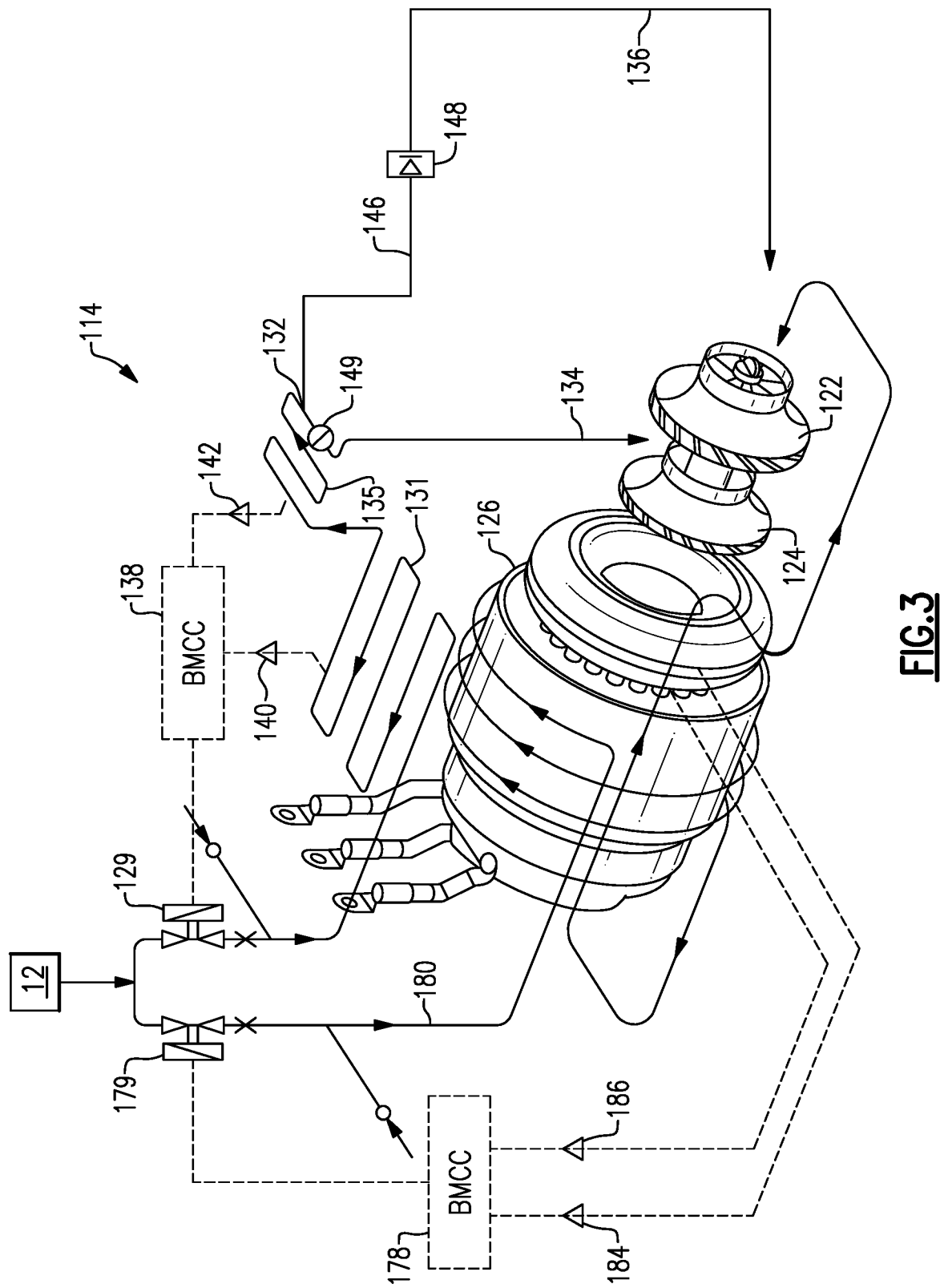
FIG. 3 is a schematic illustration of another example compressor cooling arrangement.

FIG. 3 schematically illustrates another example compressor 114. To the extent not otherwise described or shown, the compressor 114 corresponds to the compressor 14 of FIG. 2, with like parts having reference numerals preappended with a "1."

In this example, the first line 134 may be blocked off by a threaded plug 149, for example. The threaded plug 149 may be arranged in a silicon controlled rectifier (SCR) heat sink 135. In this example, the second line 136 is an internal channel 146 with a customer connection plug 148. A customer connection plug 148 may be used to control flow through the second line 136. In one example, the customer connection plug 148 may be accessed external to a compressor housing, such that the customer may manually change between the first and second modes. The customer connection plug 148 may be used in combination with a separate threaded plug 149, or without a separate plug.

In high SST applications, such as data centers cooling, the cooling line pressure difference may be lower than normal comfort cooling. Known cooling lines return cooling fluid between the first and second compressor stages. However, for high SST applications, this known arrangement may not provide even cooling due to low pressure difference. The disclosed arrangement of returning cooling fluid to the suction side may improve cooling for high SST applications, since the suction side has a lower temperature and pressure. The disclosed arrangement may also permit the cooling return to be selected based on a particular application or operating condition. Thus, the pressure difference and saturated temperature of the cooling fluid are selectable. The disclosed arrangement may be used for data center cooling, for example. This arrangement may help prevent overheating and/or too much liquid in high SST applications.

Figure 4:
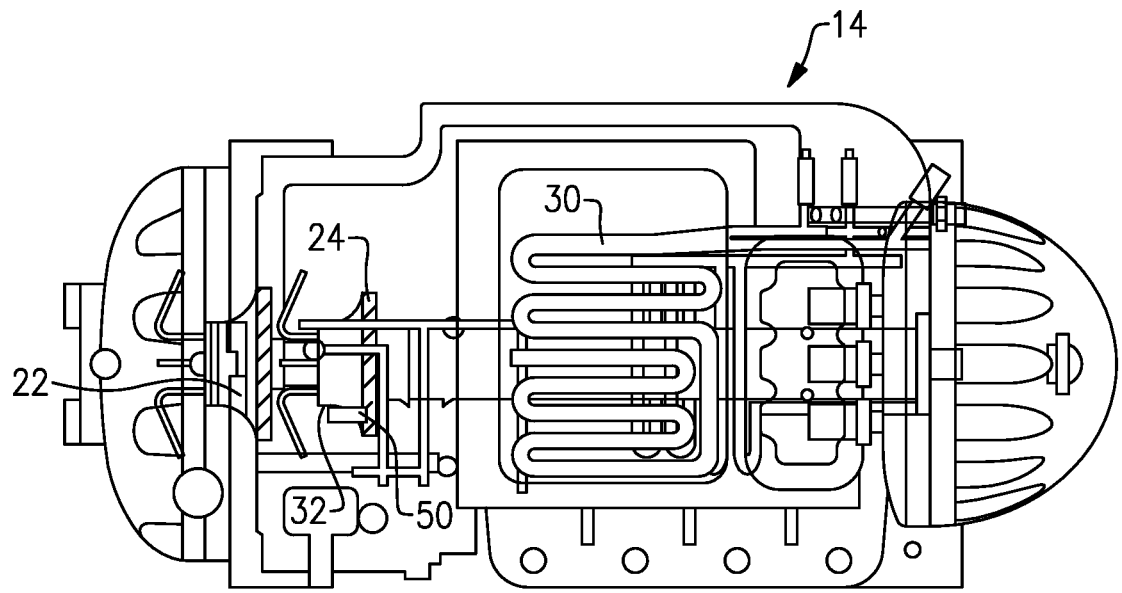
FIG. 4 illustrates a view of an example compressor in a first mode.
Figure 5:
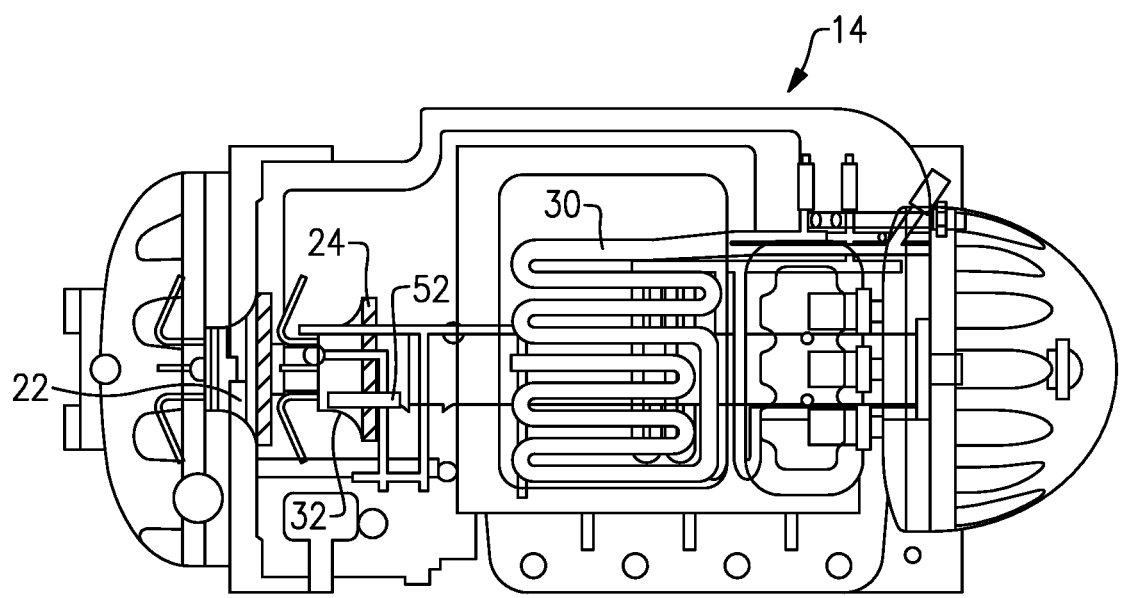
FIG. 5 illustrates a view of an example compressor in a second mode.

FIGS. 4 and 5 illustrate one example of manually switching between the first and second modes. FIG. 4 shows a view of an example compressor 14 in the first mode. In this example, a short plug 50 is used to block off the second line 36 (shown in FIG. 2). The short plug 50 is thus used in the first mode, so the cooling fluid is returned between the first and second stages via the first line 34. The short plug 50 may be a threaded plug, for example.

FIG. 5 shows a view of an example compressor 14 in the second mode. In this example, a long plug 52 is used to block off the first line 34 (shown in FIG. 2). The long plug 52 is thus used in the second mode, so the cooling fluid is returned to the suction upstream of the first stage. The long plug 52 may be a threaded plug, for example.

In some examples, the compressor 14 may be shipped to a customer with both a short plug 50 and a long plug 52. The customer can then decide whether to use the compressor 14 with the short or long plug 50, 52, depending on the application. In other examples, one of the first and second plugs 50, 52 may be sold as a separate accessory to the compressor 14. The plugs 50, 52 provide a very simple, low cost way to have a single compressor 14 operable in two modes. In some examples, the customer decides which mode to use based on the application, and does not change between the first and second modes after the compressor 14 is installed.

Although plugs are shown and described, other methods of switching flow between the first and second lines may fall within the scope of this disclosure. For example, in one example, the compressor 14 may start with a plug in place in the first mode, then the plug may be removed and a return pipe connected to the suction for the second mode. In this example, a plug may not be used when the compressor 14 is in the second mode.

It should be understood that although a particular component arrangement is disclosed and illustrated in these exemplary embodiments, other arrangements could also benefit from the teachings of this disclosure.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims.

What is claimed is:

1. A refrigerant compressor, comprising:
a first stage and a second stage downstream of the first stage; and
a cooling line configured to cool power electronics, the cooling line configured to be switched between a first mode and a second mode, wherein the first mode is configured to dump refrigerant between the first stage and the second stage, and the second mode is configured to dump refrigerant upstream of the first stage, wherein the refrigerant compressor is configured such that, during operation of the refrigerant compressor, cooling fluid flows through the cooling line to cool the power electronics when the cooling line is in either the first mode or the second mode.

2. The refrigerant compressor of claim 1, wherein the refrigerant compressor is a centrifugal compressor and the first stage comprises a first impeller and the second stage comprises a second impeller.

3. The refrigerant compressor of claim 1, further comprising a controller configured to switch between the first and second modes automatically in response to an input from a sensor.

4. The refrigerant compressor of claim 3, wherein the controller is configured to monitor a suction pressure of the refrigerant compressor, and the controller is configured to automatically switch to the second mode when the suction pressure is above a predetermined threshold.

5. The refrigerant compressor of claim 3, wherein the controller is configured to automatically direct a return of the cooling fluid in a real time manner based on operating conditions.

6. The refrigerant compressor of claim 1, wherein the cooling line is configured to be switched between the first mode and the second mode by inserting a plug along the cooling line.

7. The refrigerant compressor of claim 6, wherein the refrigerant compressor comprises a housing, and the plug is accessible external to the housing.

8. The refrigerant compressor of claim 6, wherein the plug is a threaded plug.

9. The refrigerant compressor of claim 1, further comprising a directional flow control valve configured to switch between the first mode and the second mode.

10. The refrigerant compressor of claim 1, wherein the second mode is used for high saturated suction temperature (SST) or low pressure difference cooling applications.

11. The refrigerant compressor of claim 6, wherein the plug is downstream of the power electronics.

12. The refrigerant compressor of claim 9, wherein the directional flow control valve is downstream of the power electronics.

13. The refrigerant compressor of claim 1, wherein the power electronics include an insulated-gate bipolar transistor (IGBT) and a silicon controlled rectifier (SCR).

14. A refrigerant system, comprising:
a main refrigerant loop in communication with a condenser, an evaporator, and a compressor, the compressor having a first stage and a second stage downstream of the first stage; and
a cooling line, wherein the cooling line is configured to draw cooling fluid from the main refrigerant loop, direct cooling fluid relative to power electronics of the compressor, and then direct cooling fluid back to the main refrigerant loop to one of at least two locations via a juncture of the cooling line, wherein the juncture is downstream of the power electronics and upstream of the main refrigerant loop, wherein the cooling line is configured to be switched between a first mode and a second mode, wherein, when the cooling line is in the first mode, the cooling line is configured to dump refrigerant to a first location of the at least two locations, wherein the first location is between the first stage and the second stage, wherein, when the cooling line is in the second mode, the cooling line is configured to dump refrigerant to a second location of the at least two locations, and wherein the second location is upstream of the first stage.

15. The refrigerant system of claim 14, wherein the power electronics comprises a silicon controlled rectifier, and the cooling line comprises a heat exchanger arranged to cool the silicon controlled rectifier.

16. The refrigerant system of claim 15, wherein a first plug is arranged in the heat exchanger.

17. The refrigerant system of claim 14, wherein the cooling line is configured to be switched between the first mode and the second mode by inserting a plug along the cooling line.

18. The refrigerant system of claim 14, further comprising a controller configured to switch between the first and second modes automatically in response to an input from a sensor.

19. The refrigerant system of claim 18, wherein the controller is configured to monitor a suction pressure of the compressor, and the controller is configured to automatically switch to the second mode when the suction pressure is above a predetermined threshold.

* * * * *